United States Patent Office 3,515,762
Patented June 2, 1970

3,515,762
METHOD FOR INHIBITING POLYMERIZATION OF CONJUGATED DIENES
Takeo Koide, Iwaki Nishitai, and Masaaki Niimura, Takaoka-shi, Japan, assignors to The Japanese Geon Co., Ltd., a corporation
No Drawing. Filed July 17, 1968, Ser. No. 745,373
Claims priority, application Japan, July 26, 1967, 42/47,587
Int. Cl. B01d 3/34; C07c 7/08, 7/18
U.S. Cl. 260—666.5                5 Claims

ABSTRACT OF THE DISCLOSURE

N-methyl pyrrolidone (the cyclic amide, N-methylbutyrolactam) at 0.01%–10% concentration in acyclic amide solvents such as dimethyl formamide, methylethyl acetamide etc. inhibits polymerization of conjugated diolefins and prevents adherence of tar to the surface of vessels and piping. For isoprene in DMF, tested for 120 hours at 150° C. and 3 atm., the best concentration is about 0.5–3%, for 1% polymer or less as against 25% polymer with no inhibitor and about 5% polymer at 0.05% or 10% NMP. Conventional inhibitors may be used with the cyclic-acyclic amide mixture.

---

This invention relates to a method of reducing the tendency of conjugated dienes, e.g. butadiene, isoprene and/or 1,3-pentadiene, to polymerize in solutions exposed to elevated temperatures.

The term "1,3-pentadiene" used herein should be understood to mean both cis- and trans-1,3-pentadienes and the term "butadiene" used herein should be understood to mean 1,3-butadiene.

It is known to use the techniques of solvent absorption and extractive distillation in processes for separating the valuable industrial raw material butadiene in good yield and high purity from a butadiene-containing gas mixture such as the so-called $C_4$-hydrocarbon fraction whose chief constituents are, for example, n-butane, isobutane, n-butenes, isobutene, butadiene, etc. Further it is well known to use the same techniques in processes for separating isoprene or 1,3-pentadiene in good yield and high purity from isoprene and/or 1,3-pentadiene containing gas mixture such as the so-called $C_5$-hydrocarbon fractions whose chief constituents are, for example, isoprene, 1,3-pentadiene, n-pentane, isopentane, pentene-1, pentene-2, 2-methyl-butene-1, 2-methyl-butene-2, cyclopentadiene, etc. It is also known that typical solvents used in these processes include dimethyl formamide, N-methylpyrrolidone, acetonitrile and acetone.

In the operation of these processes, however, the solvent containing the conjugated diene, e.g. butadiene, isoprene or 1,3-pentadiene, is necessarily exposed to elevated temperatures, e.g. from 80° to 160° C. or even higher, with the consequence that the conjugated diene in the solvent tends to polymerize. As a result, difficulties arise from the clogging of the apparatus with the separating polymer and the formation of a polymeric coating on the inside wall of the apparatus, and continuous operation over an extended period of time becomes practically impossible.

Especially, continuous operation is more difficult because of intensive formation of polymer, when N-alkyl lower aliphatic monocarboxylic acid amide such as dimethyl formamide, diethyl formamide and dimethyl acetamide is used as the solvent. However, the N-alkyl lower aliphatic monocarboxylic acid amide, particularly dimethyl formamide possesses advantages that it is chemically stable, the boiling point of which is appropriate from the viewpoint of solvent loss and heating and its absorbability of 1,3-butadiene or isoprene is superior to that of other solvents as well as it is reasonable. Therefore, it is acceptable as a very convenient and economic solvent if the formation of polymer is prevented.

At a room temperature or lower, the polymerization of conjugated dienes may be prevented to some extent by addition of a conventionally known polymerization inhibitor, e.g. hydroquinone, 4-tert.-butyl-catechol, $\beta$-naphthylamine. Methylene Blue, sodium nitrite, etc. However, the polymerization inhibitors as named above are not satisfactory to prevent the polymerization of the conjugated dienes when these dienes are subjected to heat treatment at a relatively high temperature, say, 80°–160° C. or even higher over a long period of time.

An object of the present invention is to provide a method of preventing the polymerization of conjugated dienes in solution at elevated temperature using as the solvent an N-alkyl lower aliphatic monocarboxylic acid amide thereby to overcome the difficulties such as hereinabove described during the separation of conjugated dienes from gas mixtures containing conjugated dienes by means of the solvent absorption or extractive distillation process. Other objects of the invention will be obvious from the contents of the specification hereinafter disclosed.

We have found that incorporation of a polymerization inhibitory amount of N-methylpyrrolidone as the polymerization inhibitor or polymerization chain transfer agent (referred to hereinafter merely as polymerization inhibitor) into a conjugated diene-containing N-alkyl lower aliphatic monocarboxylic acid amide solvent reduces the tendency of the conjugated diene to polymerize. In particular, we have found that no or little polymerization of butadiene, isoprene or 1,3-pentadiene occurs even when the resulting solution is exposed to elevated temperatures. Further, the invention enables us to prevent the polymerization of butadiene, isoprene or 1,3-pentadiene even when water is present in a solution containing these conjugated dienes. Accordingly, the present invention provides a method of reducing the tendency of butadiene, isoprene and/or 1,3-pentadiene to polymerize in solutions exposed to elevated temperatures, which comprises adding to the solution, as polymerization inhibitor, N-methylpyrrolidone. The invention also includes a butadiene, isoprene or 1,3-pentadiene solution containing, as polymerization inhibitor, N-methylpyrrolidone.

The invention is particularly applicable to butadiene, isoprene or 1,3-pentadiene solution wherein the solvent is an N-alkyl lower aliphatic monocarboxylic acid amide used in the separation of butadiene, isoprene or 1,3-pentadiene from butadiene, isoprene or 1,3-pentadiene containing gas mixtures by solvent absorption or extractive distillation as discussed hereinbefore. According to this invention, the polymerization of butadiene, isoprene or 1,3-pentadiene can be prevented even in the presence of iron rust which rather promotes the polymerization of conjugated dienes. Therefore, it is possible to separate butadiene, isoprene or 1,3-pentadiene stably and continuously over an extended period of time from the mixed gases containing butadiene, isoprene or 1,3-pentadiene by means of the solvent absorption or extractive distillation processes, without employing apparatus made from such expensive materials as stainless steels.

Although the amount of the polymerization inhibitor compound used is capable of wide variation depending upon such factors as the class of solvent, the water content of the solvent, operating conditions and the presence or absence of iron rust, in general, the objectives of this invention can be achieved by the incorporation of about 0.05–10%, and preferably 0.5–3%, based on the weight of the solvent. Excess amount of the polymerization inhibitor increases, on the contrary, formation of polymer. For example, when N-methylpyrrolidone is used in the amount of 100% by weght, or in other words, when N-methylpyrrolidone is used as the solvent, a larger amount of polymers are formed.

The polymerization inhibitor, N-methylpyrrolidone, may be used singly or in combination with another polymerization inhibitor such as furfural, benzaldehyde, nitrobenzene and its derivative, α,β-unsaturated nitrile, aromatic mercaptan, aliphatic nitro compound, cinnamic aldehyde, aldol, α-nitroso-β-naphthol, isathin, morpholine, etc. to have thereby increased effect for the prevention of undesired polymerization.

The effect of the polymerization inhibitor according to the invention is further promoted by the conjoint presence in the system of substances which are well-known as polymerization inhibitors or stabilizers for unsaturated compounds. Presumably, this is the result of a synergistic action between these substances and the additive used in accordance with the present invention. Known substances of this class include, for example, Methylene Blue, sodium nitrite, hydroquinone, sulphur, phenolic compounds such as tertiary butyl catechol, and aromatic amines such as β-naphthylamine. The conventional amounts or less of such substances may be used.

It is to be noted that the solvent solutions containing butadiene, isoprene and/or 1,3-pentadiene can be equally prevented from polymerization by the incorporation of the polymerization inhibitor according to the present invention. Further, their polymerization inhibiting effect does not decrease at all even in the presence of higher polymerization of butadiene or isoprene and 1,3-pentadiene.

The polymerization inhibitor used in this invention shows the particularly remarkable effect on isoprene, which is superior to that obtained by using furfural or nitrobenzene alone.

The extractive solvent used is an N-alkyl lower aliphatic monocarboxylic acid amide of the structural formula:

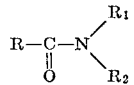

(wherein R and $R_1$ each represent hydrogen or a lower alkyl of 1 to 3 carbon atoms and $R_2$ represents a lower alkyl of 1 to 3 carbon atoms) and includes mono-methyl formamide monoethyl formamide, dimethyl formamide, diethyl formamide, dimethyl acetamide, methyl propyl acetamide, etc.

Now the present invention will be explained in detail in conjunction with the following examples.

EXAMPLE 1

An iron vessel having iron rust was charged with dimethyl formamide and the various polymerization inhibitors in the amounts indicated hereinafter. Isoprene was introduced under pressure to a gauge pressure of 2 kg./cm.$^2$, while maintaining the temperature at 150° C. After 120 hours, state of the solutions, polymer content in the solution and adhesion of polymer to the vessel were examined. The following results were obtained.

| | Additive | Concentration | State of the solution | Content of polymer (percent by weight) | Adhesion of polymer |
|---|---|---|---|---|---|
| 1 | None | | Turbid | 25 | Large amount of gummy material adhered. |
| 2 | N-methylpyrrolidone, vol. percent | 0.5 | Slightly turbid | 1.0 | No adhesion was observed. |
| 3 | do | 1 | Transparent | 0.2 | Do. |
| 4 | do | 3 | do | 0.5 | Do. |
| 5 | do | 5 | Slightly turbid | 2 | Do. |
| 6 | do | 10 | do | 5 | Do. |
| 7 | Furfural, vol. percent | 3 | Turbid | 3 | Tar like material adhered at the bottom. |
| 8 | Nitrobenzene, vol. percent | 3 | do | 4 | Do. |
| 9 | Sulfur, p.p.m | 500 | do | 10 | Large amount of gummy material adhered. | acetylenes such as methyl acetylene, vinyl acetylene, propyl acetylene, or allenes such as 1,2-butadiene. More specifically, polymer formation can be inhibited by adding the polymerization inhibitor to a solution containing the acetylenes or allenes in addition to butadiene, isoprene and/or 1,3-pentadiene.

The polymerization inhibitors according to the invention are also effective in the presence of saturated hydrocarbons such as butane, n-pentane and isopentane, monoolefins such as butene-1, isobutene, pentene-1, pentene-2, 2-methylbutene-1, 1-methylbutene-2, and cyclopentadiene. Accordingly, the incorporation of these polymerization inhibitors to the so-called $C_4$- or $C_5$-hydrocarbon fraction is completely effective for preventing undesired When N-methyl pyrrolidone was used in place of whole of dimethyl formamide, gummy material adhered to the vessel and 6% by weight of polymer was contained in the solution.

EXAMPLE 2

An iron vessel having iron rust was charged with dimethyl formamide, N-methylpyrrolidone and water in the amounts indicated hereinafter. Isoprene was introduced under pressure to a gauge pressure of 2 kg./cm.$^2$, while maintaining the temperature at 150° C. After 120 hours, state of the solution, content of polymer in the solution and adhesion of polymer to the vessel were examined. The following results obtained.

| | Additive | Concentration, vol. percent | State of the solution | Content of polymer (percent by weight) | Adhesion of polymer |
|---|---|---|---|---|---|
| 1 | Water | 1 | Turbid | 25 | Large amount of gummy material adhered. |
| 2 | Water / N-methylpyrroldone | 1 / 1 | Transparent | 0.5 | No adhesion was observed. |
| 3 | Water / N-methylpyrrolidone | 2 / 1 | do | 0.7 | Do. |
| 4 | Water / N-methylpyrrolidone | 1 / 2 | do | 0.2 | Do. |
| 5 | Water / N-methylpyrrolidone | 2 / 2 | do | 0.3 | Do. |
| 6 | Water / N-methylpyrrol done | 5 / 2 | Slightly turbid | 1 | Do. |

EXAMPLE 3

An iron vessel having iron rust was charged with dimethyl formamide and the various polymerization inhibitors in the amounts indicated hereinafter. Isoprene was introduced under pressure to a gauge pressure of 2 kg./cm.$^2$, while maintaining the temperature at 150° C. After 120 hours, state of the solution, content of polymer in the solution and adhesion of polymer to the vessel were examined. Following results were obtained.

| | Additive | Concentration vol. percent | State of the solution | Content of polymer (percent by weight) | Adhesion of polymer |
|---|---|---|---|---|---|
| 1 | N-methylpyrrolidone | 1 | Transparent | 0.2 | No adhesion was observed. |
| 2 | N-methylpyrrolidone / Furfural | 1 / 1 | do | 0.5 | Do. |
| 3 | N-methylpyrrolidone / Nitrobenzene | 1 / 1 | do | 0.2 | Do. |
| 4 | Furfural / Nitrobenzene | 1 / 1 | Turbid | 3.0 | Tar like material adhered at the bottom. |
| 5 | N-methylpyrrolidone / Furfural / Nitrobenzene | 1 / 1 / 1 | Slightly turbid | 0.5 | No adhesion was observed. |

When N-methylpyrrolidone is used alone, a smaller amount of polymer is contained in the solution but sometimes gummy material is formed. Complete inhibition of production of gummy material can be accomplished by jointly using furfural, nitrobenzene or the like.

EXAMPLE 4

An iron vessel having iron rust was charged with dimethyl formamide and the various polymerization inhibitors in the amounts indicated hereinafter. Isoprene was introduced under pressure to a gauge pressure of 2 kg./cm.$^2$, while maintaining the temperature at 150° C. After 120 hours, state of the solution, content of polymer in the solution and adhesion of polymer to the vessel were examined. Following results were obtained.

| | Additive | Concentration | State of the solution | Content of polymer (percent by weight) | Adhesion of polymer |
|---|---|---|---|---|---|
| 1 | N-methylpyrrolidone, vol. percent | 1 | Transparent | 0.2 | No adhesion was observed. |
| 2 | do | 2 | do | 0.5 | Do. |
| 3 | N-methylpyrrolidone, vol. percent / Sulfur, p.p.m. | 1 / 1,000 | do | 0.1 | Do. |
| 4 | N-methylpyrrolidone, vol. percent / Furfural, vol. percent | 1 / 1 | do | 0.5 | Do. |
| 5 | N-methylpyrrolidone, vol. percent / Nitrobenzene, vol. percent | 1 / 1 | do | 0.2 | Do. |

EXAMPLE 5

An iron vessel having iron rust was charged with dimethyl formamide and the various polymerization inhibitors in the amounts indicated hereinafter. While maintaining the temperature at 150° C., C$_5$-hydrocarbon fraction consisting of the following approximate compositions was introduced under pressure to a gauge pressure of 2 kg./cm.$^2$.

Composition of C$_5$-hydrocarbon fraction (mol percent)

n-Pentane _____ 20
i-Pentane _____ 20
Pentene-1 _____ 11
Pentene-2 _____ 12
2-methylbutene-1 _____ 3
2-methylbutene-2 _____ 3
1,3-pentadiene _____ 10
Cyclopentadiene _____ 8
Isoprene _____ 12
Butyne-2 _____ 0.5
Isopropylacetylene _____ 0.5

After 120 hours, state of the solution, content of polymer in the solution and adhesion of polymer to the vessel were examined. The following results were obtained.

| | Additive | Concentration | State of the solution | Content of polymer (percent by weight) | Adhesion of polymer |
|---|---|---|---|---|---|
| 1 | N-methylpyrrolidone, vol. percent / Sulfur, p.p.m. | 1 / 1,000 | Transparent | 0.1 | No adhesion was observed. |
| 2 | N-methylpyrrolidone, vol. percent / 4-t-butylcatechol, p.p.m. | 1 / 1,000 | Practically transparent | 0.5 | Do. |
| 3 | N-methylpyrrolidone, vol. percent / Sodium nitrite, p.p.m. | 1 / 1,000 | Transparent | 0.3 | Do. |
| 4 | Sodium nitrite, p.p.m. | 1,000 | Turbid | 7 | Tar like material adhered at the bottom. |
| 5 | N-methylpyrrolidone, vol. percent / Hydroquinone, p.p.m. | 1 / 1,000 | Transparent | 1.0 | No adhesion was observed. |
| 6 | 4-t-butylcatechol, p.p.m. | 1,000 | Turbid | 15 | Large amount of gummy material adhered. |

EXAMPLE 6

An iron vessel having iron rust was charged with diethyl formamide and the various polymerization inhibitors in the amounts indicated hereinafter. Isoprene was introduced under pressure to a gauge pressure of 2 kg./cm.$^2$, while maintaining the temperature at 170° C. After 120 hours, state of the solution, content of polymer in the solution and adhesion of polymer to the vessel were examined. The following results were obtained.

| Additive | Concentration | State of the solution | Content of polymer (percent by weight) | Adhesion of polymer |
|---|---|---|---|---|
| 1 .......... None ....................................... | .......... | Turbid .......... | 8 | Large amount of gummy material adhered. |
| 2 .......... N-methylpyrrolidone, vol. percent .... | 0.05 | Slightly turbid .... | 4.0 | Practically no adhesion was observed. |
| 3 .......... do ....................................... | 1 | Transparent .......... | 0.2 | No adhesion was observed. |
| 4 .......... do ....................................... | 5 | Slightly turbid .... | 2.0 | Do. |
| 5 .......... do ....................................... | 10 | .....do .......... | 5.0 | Practically no adhesion was observed. |
| 6 .......... Furfural, vol. percent .................. | 2 | Turbid .......... | 9.5 | Tar like material and gummy material adhered. |
| 7 .......... Nitrobenzene, vol. percent .......... | 2 | .....do .......... | 12 | Do. |
| 8 .......... Sodium nitrite, p.p.m .......... | 1,000 | .....do .......... | 10 | Large amount of tar adhered. |
| 9 .......... {N-methylpyrrolidone, vol. percent ....<br>{Sulfur, p.p.m .......... | 1<br>1,000 | }Transparent .......... | 0.2 | No adhesion was observed. |

EXAMPLE 7

An iron vessel having iron rust was charged with dimethyl acetamide and the various polymerization inhibitors in the amounts indicated hereinafter. Isoprene was introduced under pressure to a gauge pressure of 2 kg./cm.$^2$, while maintaining the temperature at 160° C. After 120 hours, state of the solution, content of polymer in the solution and adhesion of polymer to the vessel were examined. The following results were obtained.

| Additive | Concentration | State of the solution | Content of polymer (percent by weight) | Adhesion of polymer |
|---|---|---|---|---|
| 1 .......... None ....................................... | .......... | Turbid .......... | 10 | Large amount of gummy material adhered. |
| 2 .......... N-methylpyrrolidone, vol. percent .... | 0.05 | Slightly turbid .... | 5 | Practically no adhesion was observed. |
| 3 .......... do ....................................... | 2 | Transparent .......... | 0.3 | No adhesion was observed. |
| 4 .......... do ....................................... | 5 | .....do .......... | 1.5 | Do. |
| 5 .......... do ....................................... | 10 | Slightly turbid .... | 4 | Practically no adhesion was observed. |
| 6 .......... Hydroquinone, p.p.m .......... | 200 | Turbid .......... | 12 | Gummy material and tar like material adhered. |
| 7 .......... Furfural, vol. percent .......... | 2 | .....do .......... | 11 | Do. |
| 8 .......... {N-methylpyrrolidone, vol. percent ....<br>{Sulfur, p.p.m .......... | 1<br>1,000 | }Transparent .......... | 0.2 | No adhesion was observed. |

EXAMPLE 8

An iron vessel having iron rust was charged with dimethyl formamide and the various polymerization inhibitors in the amounts indicated hereinafter. Butadiene was introduced under pressure to a gauge pressure of 4 kg./cm.$^2$, while maintaining the temperature at 150° C. After 120 hours, state of the solution, content of polymer in the solution and adhesion of polymer to the vessel were examined. The following results were obtained.

| Additive | Concentration | State of the solution | Content of polymer (percent by weight) | Adhesion of polymer |
|---|---|---|---|---|
| 1 .......... N-methylpyrrolidone, vol. percent .... | 0.5 | Slightly turbid .... | 3.0 | No adhesion was observed. |
| 2 .......... do ....................................... | 2 | Transparent .......... | 0.2 | Do. |
| 3 .......... do ....................................... | 5 | .....do .......... | 1 | Do. |
| 4 .......... do ....................................... | 10 | Slightly turbid .... | 5.5 | Tar like material slightly adhered. |
| 5 .......... Furfural, vol. percent .......... | 0.5 | Transparent .......... | 2 | Do. |
| 6 .......... Sodium nitrite, p.p.m .......... | 500 | Slightly turbid .... | 2 | Do. |
| 7 .......... Nitrobenzene, vol. percent .......... | 1 | Transparent .......... | 2 | No adhesion was observed. |
| 8 .......... {Furfural, vol. percent .......... <br>{Sodium nitrite, p.p.m .......... | 0.5<br>500 | }.....do .......... | 1 | Do. |
| 9 .......... 4-t-butylcatechol, p.p.m .......... | 100 | Turbid .......... | 9 | Large amount of gummy material adhered. |

What we claim is:

1. A method for reducing the tendency of a conjugated diene to polymerize in N-alkyl lower aliphatic monocarboxylic acid amide solvent solution exposed to elevated temperatures, which comprises adding to the solution, as polymerization inhibitor, N-methyl pyrrolidone in an amount of 0.01 to 10% by weight based on the solvent of the solution.

2. A method according to claim 1, wherein said conjugated diene is butadiene, isoprene, 1,3-pentadiene or the mixture thereof.

3. A method according to claim 1, wherein said conjugated diene is in the form of a $C_4$- or $C_5$-hydrocarbon fraction.

4. A method according to claim 1, wherein said solution comprises an N-alkyl lower aliphatic monocarboxylic acid amide solvent selected from monomethyl formamide, dimethyl formamide, monoethyl formamide, diethyl formamide, dimethyl acetamide, methyl propyl acetamide.

5. A method according to claim 1, wherein, in addition to the said polymerization inhibitor, there is also added an inhibitor selected from the group consisting of sodium nitrite, Methylene Blue, sulphur, tertiary butyl catechol, β-naphthyl amine, furfural, benzaldehyde, cinnamic aldehyde, aldol, isatin, morpholine, α-nitroso-β-naphthol, α,β-unsaturated nitrile, aromatic mercaptan and aromatic nitro compound.

(References on following page)

References Cited

UNITED STATES PATENTS

| | | | |
|---|---|---|---|
| 2,388,041 | 10/1945 | Craig | 203—9 |
| 2,449,010 | 9/1948 | Robey et al. | 260—666.5 |
| 2,478,710 | 8/1949 | Robey | 260—666.5 |
| 2,557,684 | 6/1951 | Powers | 252—404 X |
| 3,260,766 | 7/1966 | Nudenberg et al. | 260—677 |
| 3,309,412 | 3/1967 | Sakuragi et al. | 260—666.5 |
| 3,340,160 | 9/1967 | Waldby | 252—405 X |
| 3,405,189 | 10/1968 | Sakuragi et al. | 260—666.5 |
| 3,407,240 | 10/1968 | Sakashita et al. | 260—666.5 |

DELBERT E. GANTZ, Primary Examiner

G. E. SCHMITKONS, Assistant Examiner

U.S. Cl. X.R.

203—7, 9, 51, 58, 60; 208—48; 252—405; 260—681.5